United States Patent Office 3,808,289
Patented Apr. 30, 1974

3,808,289
NOVEL FLAME-RESISTANT FIBERS AND
METHOD OF PRODUCING THE SAME
Tomomi Okuhashi, Yasuaki Watanabe, Junji Shimizu, and Yuji Umezu, Tokyo, Japan, assignors to Teijin Limited, Osaka, Japan
No Drawing. Filed Sept. 13, 1972, Ser. No. 288,783
Int. Cl. C08g 37/18, 51/56
U.S. Cl. 260—841                                        7 Claims

ABSTRACT OF THE DISCLOSURE

A method of preparing flame-resistant fibers from a mixed composition of a fusible, curable phosphorus modified novolak resin and a fiber-forming polyamide.

---

This invention relates to novel flame-resistant fibers, and a method of producing the fibers. More specifically, it relates to novel fibers having superior flame-resistance and fire retardancy and practical fiber properties, and a method of producing the fibers with industrial ease.

Thermosetting phenolic resins have been well known as fabricating materials having good flame-resistance and fire retardancy. Of late, attempts have been made to produce flame-resistant fibers from these phenolic resins. For example, there is a known method comprising melt-spinning a fusible novolak-type phenolic resin to form fibers, and curing the fibers to render them infusible (British Pat. 1,256,924).

Since such phenolic resins have a molecular weight of less than 1,000, they have a very low melt viscosity, and do not have sufficient spinnability. The spinning of such phenolic resins meets with a number of difficulties, and they cannot be handled by the ordinary spinning method.

Spun uncured fibers have low tensile strength, and lack suppleness and flexibility, which defects render it necessary to pay special attention in handling the fibers in wind-up and cause a number of troubles during cure-treatment.

Moreover the cured fibers have the serious defect of incapability of being dyed. In addition, such fibers have poor light resistance, and are considerably colored by the action of light.

Attempts have also been made to incorporate a small amount of a phenolic resin into polyamide fibers and treat the fibers with formaldehyde in the presence of an alkaline catalyst, in order to improve the modulus of elasticity or heat-shrinkage of the polyamide fibers (Japanese Pat. 490,574). The incorporation of such a small amount of a phenolic resin is insufficient for rendering the fibers infusible, and flame-resistant fibers such as those contemplated by the present invention cannot be obtained.

Accordingly, an object of this invention is to provide fibers having superior flame-resistance, physical properties and dyeability, which can be produced easily on an industrial scale, and a method of producing these fibers.

The above object can be achieved in accordance with this invention by a method of producing flame-resistant fibers which comprises melt-spinning a mixture of 60–90% by weight of a fusible, curable phosphorus modified, novolak resin having a phosphorus content of at least 0.5% by weight and 10 to 40% by weight of a fiber-forming polyamide, and treating the resulting fusible uncured fibers with formaldehyde in the presence of an acid catalyst. As used herein, the term "phosphorus modified novolak" refers to a novolak resin containing phosphorus moieties chemically bonded to it.

The novolak resins used in this invention are fusible and essentially remain so under the melt-spinning conditions, becoming infusible by formaldehyde treatment in the presence of an acid catalyst. Any phenolic resins meeting these requirements can be used. Examples of the novolaks are those obtained by condensation of phenols [such as phenol, cresol, phenylphenol, 3,5-dialkylphenols, chlorophenol, resorcinol, naphthol, or 2,2-bis(p,p'-hydroxyphenyl) propane] with formaldehyde in the presence of an acid catalyst such as an inorganic acid, e.g. hydrochloric acid or sulfuric acid, or an organic acid, e.g. formic acid.

Fibers of improved flame-resistance, dyeability and whiteness can be obtained by using a novolak modified with phosphorus. Examples of the phosphorus-modified novolaks are the reaction products of novolaks with monohalogeno phosphorus compounds, such as diphenyl phosphorochloridate, dicresylphosphorochloridate, bis(p-chlorophenyl) phosphorochloridate, diphenylphosphorobromidate, diphenylphosphinic acid chloride, diphenylphosphorochloride thioate or diphenylchlorophosphine; ester-interchange reaction products of novolaks with phosphoric acid triesters of the formula

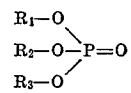

wherein $R_1$, $R_2$ and $R_3$ may be the same or different, and represent a phenyl group, an alkyl-substituted phenyl group or a halogen-substituted phenyl group; or reaction products obtained by the reaction of phenols, formaldehyde and copolymerizable phosphorus-containing compounds such as triphenyl phosphite or di(p-hydroxy phenyl) phenylphosphine oxide.

The phosphorus modified novolaks may be used alone or in admixture. An ester-interchange reaction product of a novolak with triphenyl phosphate is especially preferred from the standpoint of flame-resistance, economy and ease of production.

As used herein, the term "fiber-forming polyamide" refers to "nylon." Examples of the fiber-forming polyamide that can be used in the present invention include nylon-6, nylon-66, nylon 6,10, nylon-11, nylon-12, poly-m-xylylene adipamide, copolymers or mixture of these which have a softening point of 100° C. to 280° C. Nylon-6 having a relatively low melting point is especially preferred.

The proportion of the phosphorus modified novolak and the fiber-forming polyamide is an important factor in obtaining uncured fibers having superior suppleness, flexibility, suitable elongation, and ease of handling during the spinning operation, and also exerts considerable influence on the flame resistance and dyeability of the final product. In order to achieve the object of this invention, the fiber-forming mixture should consist of 60 to 90% by weight, preferably 65 to 85% by weight, of the phosphorus modified novolak and 10 to 40% by weight, preferably 15 to 35% by weight, of the fiber-forming polyamide. If the amount of the phosphorus modified novolak is less than 60% by weight and the amount of the polyamide is in excess of 40% by weight, the polyamide component dissolves out at the time of the formaldehyde treatment, and the tenacity of the fibers becomes extremely poor. In addition, the flame-resistance of the fibers as final product is not sufficient, and the spinning temperature becomes higher to cause the gelation of the molten mixture. On the other hand, if the amount of the phosphorus modified novolak exceeds 90% by weight and the amount of the polyamide is less than 10% by weight, it is difficult to perform spinning in stable condition, which greatly reduces the elongation of the uncured fibers obtained. Therefore, the good spinnability of the mixed composition and the easy handling of the fibers expected from the incorporation of the polyamide cannot be exhibited sufficiently. Furthermore, the dyeability of the final fibers is also reduced.

The amount of phosphorus contained in the phosphorus-modified novolak is at least 0.5% by weight, preferably 0.7 to 3.0% by weight, calculated as phosphorus atom, based on the total amount of the mixed composition. If the amount is less than 0.5% by weight, the effect of improving flame-resistance, whiteness and dyeability is insufficient.

The above mixed composition may be stabilized by addition of a small amount of an inorganic or organic stabilizer such as copper chloride or 2,6-t-butyl-p-cresol. It is also possible to incorporate an additive such as a pigment, dye or delusterant.

According to the method of this invention, a mixed composition of the phosphorus modified novolak and the fiber-forming polyamide is first prepared, and the composition is then melt-spun. The preparation of the mixed composition may be carried out by any procedure which ensures uniform mixing of the two components. For example, it can be performed by melt-mixing the powders of the phosphorus modified novolak and the chips of the fiber-forming polyamide in a vessel or by extruder; or by melting the phosphorus modified novolak and the polyamide separately, and then mixing them. A small amount of a solvent for both components, such as phenol or m-cresol, may be added, in which case both components are mixed under heating followed by removal of the solvent, to form a uniform mixed composition.

The preparation of a phosphorus-modified mixed composition may be effected first by preparing a composition containing phosphorus in an amount higher than the prescribed content and then adding an unmodified novalak and/or a fiber-forming polyamide to bring the content of each component to the prescribed concentration.

The ester-interchange reaction product described above of a novolak resin and a phosphoric acid triester of the general formula

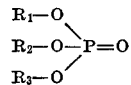

wherein $R_1$, $R_2$ and $R_3$ may be the same or different, and represent a phenyl group, alkyl-substituted phenyl group or halogen-substituted phenyl group, can be conveniently obtained by reacting the novolak with the phosphoric acid triester in the presence of the polyamide. The polyamide is considered to act as a catalyst for promoting the ester-interchange reaction.

Examples of $R_1$, $R_2$ and $R_3$ of the general formula are phenyl, tolyl, ethylphenyl, propylphenyl, butylphenyl, chloroethylphenyl, chlorophenyl and bromophenyl groups.

Specific examples of the phosphoric acid triester are triphenyl phosphate, tricresyl phosphate, diphenyl cresyl phosphate, tri(chlorophenyl)phosphate, tri(bromophenyl) phosphate, di(chlorophenyl)phenyl phosphate, di(chlorophenyl)phenyl phosphate, di(bromophenyl)phenyl phosphate.

The phosphorus-modified novolak can be obtained by heat-melting the novolak, the polyamide and a phosphoric acid triester and performing ester-interchange reaction, while evaporating off the hydroxyl compound formed. The reaction is stopped when 0.8 to 1.5 equivalents of the ester groups of the phosphoric acid triester is ester-interchanged. If more than 1.5 equivalents of the ester groups are reacted, the product tends to be gelled. The reaction is usually carried out at 160 to 270° C., preferably 180–240° C. and a pressure of 1.0 to 50.0 mm. Hg for 0.5 to 5 hours.

The amount of the polyamide which is present in the ester-interchange reaction system is at least 1% by weight, and preferably at least 5% by weight, of the total amount of the novolak, phosphorus compound and polyamide.

By the presence of the polyamide, the ester-interchange reaction is promoted by more than five times as much as the reaction in the presence of an ordinary ester-interchange reaction catalyst, for example zinc acetate. This is indeed surprising. The polyamide present in the ester-interchange reaction system may be all or part of the polyamide used for preparing the mixed composition.

The mixed composition consisting of 60–90% by weight of the phosphorus modified novolak and 10–40% by weight of the polyamide usually has a flow initiation temperature of about 90° to 170° C., and has a melt viscosity of 1,000 to 7,000 at a temperature of 110 to 190° C. The mixed composition has better spinnability than the novolak alone because of the presence of the polyamide component, and moreover, changes in melt viscosity with changes in temperature are less than when using the novolak resin alone, and stable melt-spinning can be carried out over a wider range of temperature. Accordingly, the mixed composition used in this invention can give uncured fusible fibers of more uniform denier than the novolak alone does, because of the presence of the polyamide component.

The mixed composition is converted to fiber by melt-spinning with an appartus of the conventional type. Generally, spinning can be performed at a draft of 100 to 1500 and a spinning temperature of 110 to 190° C., and there can be obtained uncured fusible fibers having a monofilament denier of 1 to 10, a tenacity of 0.5 to 2.0 g./de. and an elongation of 5 to 200%.

The uncured fusible fibers obtained have superior suppleness flexibility because of the polyamide component, and lend themselves to easy handling, and can be wound up while traversing.

The uncured fusible fibers are then treated with formaldehyde to cure them and render them infusible. The uncured fibers before treatment consist mainly of a novolak, and are dissolved or deteriorated by an alkali, especially an alkali hydroxide. Therefore, an acid catalyst is used.

Suitable formaldehydes are gaseous formaldehyde, aqueous solution of formaldehyde (Formalin), and trioxane or paraformaldehyde which evolves formaldehyde. Hydrogen chloride is preferred as the acid catalyst. Inorganic acids such as sulfuric acid or phosphoric acid or organic acids such as p-toluenesulfonic acid can also be used. Salts such as magnesium chloride, zinc chloride or ammonium chloride may be used conjointly as promotors. From the viewpoint of the uniformity and speed of the reaction, the uncured fibers are preferably immersed in an aqueous solution of formaldehyde containing a catalyst of the type described. The fibers may also be treated with formaldehyde gas and hydrogen chloride gas. In the solution immersion procedure, a treating bath containing 1–50% by weight, preferably 10 to 35% by weight, of formaldehyde is used, and in the gaseous phase method, a gaseous mixture containing 5 to 95% by volume, preferably 10 to 70% by volume, of formaldehyde is used. Irrespective of the method of treatment, the acid catalyst is generally used in an amount of 0.1 to 10 equivalents, preferably 0.3 to 3 equivalents, of formaldehyde.

Since the uncured fibers before treatment with formaldehyde is still soluble and fusible, care must be taken not to cause deterioration in the quality of the fibers by dissolving, shrinking or adhering during the treatment with formaldehyde. The critical temperature at which to cause serious deterioration in the quality of the fibers in this formaldehyde treatment is about 50 to 60° C. It is preferred to pre-cure the fibers for sufficient periods of time at a temperature lower than this critical temperature, and then complete the cure (cross-linkage) at a temperature of 80 to 180° C. The uncured fibers of this invention can be treated with formaldehyde within shorter periods of time than those of the novolak alone, because of the presence of the polyamide. It is surprising that the polyamide component in the uncured fibers of this invention is not substantially dissolved by the acid during the formaldehyde treatment.

If the uncured fibers are crimped in advance, and then treated with formaldehyde in the above-described manner, there can be obtained cured crimped fibers of excellent crimp fastness.

The cured unfusible fibers after formaldehyde treatment may be heat treated at 120°–250° C., preferably 130°–180° C., in the absence of oxygen (e.g. in vacuo or in nitrogen) in order to increase their flame-resistance and solvent resistance and increase the tenacity and elongation of the fibers. By this heat-treatment, formaldehyde, acid and volatile substance remaining in the fibers are removed. At a temperature lower than 120° C., the heat-treating effect is small. At very high temperature, coloration of the fibers occurs and the dyeability of the fibers is poor.

Because they contain the polyamide component, the fibers can be drawn to at least 1.1 times at 100° to 300° C. after the partial or whole cure-treatment with formaldehyde, and by this drawing, the tenacity of the fibers can be increased. The fibers can be drawn after the heat treatment.

The fibers obtained can be crimped. Crimping can be conveniently performed using a stuffer box or gear. The crimped fiber so obtained had good fastness and uniformity.

The fibers of this invention, because they contain the polyamide component and phosphorus modified novolak component, can be dyed deeply with disperse dyes by high pressure dyeing or carrier dyeing. On the other hand, fibers of a novolak alone can hardly be dyed.

The fibers of this invention also have high elastic recovery, good flame-resistance, whiteness (little coloration) and dyeability, and are less discolored by light.

In the fibers of this invention, phosphorus is uniformly and firmly bonded to the fibers, and is not removable by dyeing or washing. Therefore, the fibers of this invention possess durable flame resistance.

Fibers obtained by melt spinning a mixture of novolak not modified with phosphorus and a fiber-forming polyamide and treating the filaments with formaldehyde may then be treated with a phosphorus-containing compound to incorporate phosphorus into the fibers. Using this method, however, it is difficult to incorporate phosphorus into the fibers in an amount sufficient to impart good flame resistance without impairing the other properties of the fibers. In addition, phosphorus incorporated in the fibers is readily removable, making it impossible to obtain fibers having durable flame resistance. Furthermore, the operation becomes complicated.

The fibers of this invention can be spun on a spinning frame either alone or as a blend with other fibers. In the case of a blend, it is preferred to incorporate 30 to 80% by weight of the fibers of the invention.

The fibers of the present invention can be used in the form of filaments, staple fibers or yarns, can be made into woven, knitted, or non-woven fabrics, and can also be used as filling materials.

The fibers of this invention, because of their flame-resistance, are useful as heat-insulating garments, fire-brigade garments, aviation garments, racer garments, lining of automobiles or airplanes, curtains, pajamas, and other fields where fire-retardancy and flame-resistance are required. They are also useful as filtering materials having resistance to chemicals and heat.

The invention will be described by the following examples.

The flow initiation temperature and the melt viscosity of the phosphorus modified novolaks and the mixed composition were measured by means of a Koka type flow tester (nozzle 0.5 mm. diameter x 1.0 mm. length, rate of temperature rise 3° C./min., extruding pressure 10 kg./cm.$^2$).

Unless otherwise specified, the melt viscosities are those at the spinning temperature.

The flame resistance of the resulting fibers are measured by the following methods.

(1) Matchstick test 100 mg. of the test fibers were maintained for 10 seconds in a flame of a matchstick, and then withdrawn from the flame. The state of burning was observed at this time, and the results were evaluated on a scale of three grades shown in Table 1 below.

TABLE 1

| Grade of flame-resistance | State of combustion |
| --- | --- |
| A | When the sample was withdrawn from the flame, it was immediately extinguished. |
| B | When the sample was withdrawn from the flame, the burning continued for 1 to 9 seconds, but it was self-extinguishing. |
| C | After withdrawal from the flame, the sample continued to burn for more than 10 seconds. The burning was propagated, and the sample was burnt up. |

(2) Bunsen burner test 100 mg. of the sample fibers were filled in a cylindrical cage (stainless steel wire cage, 5 mesh) with a diameter of 8 mm. and a height of 25 mm., and placed in the flame of a Bunsen burner (inner diameter 11 mm., reducing flame length 30 mm., oxidizing flame length 140 mm., propane gas) for 15 seconds. After withdrawal from the flame, the time during which the sample still continued to burn (flame remaining time) was measured. After cooling, the weight of the sample was measured, and the weight retention was calculated.

(3) L.O.I. (limited oxygen index) test

In accordance with the method disclosed in ASTM (D-2863-1970), the limited oxygen index (the minimum concentration of oxygen, expressed as percent by volume in a mixture of oxygen and nitrogen, which will just support combustion of a material) was determined by an oxygen index type combustion tester ON-1. The sample used was a rod-shaped staple fiber 0.5 g. in weight and 10 cm. in length.

In the examples, all parts and percentages are by weight unless otherwise specified.

EXAMPLE 1

A reactor was charged with 235 parts of phenol, 24 parts of water, 175 parts of a 37% aqueous solution of formaldehyde and 1.8 parts of oxalic acid dihydrate, and with stirring, the mixture was heated under reflux for 1 hour. 1.8 parts of oxalic acid dihydrate were further added, followed by heating under reflux for one hour. After cooling, a dilute aqueous solution of sodium hydroxide was added to adjust the pH of the mixture to 4, and 800 parts of water were added. The mixture was allowed to stand for 30 minutes, and an aqueous layer at the upper part was removed by decantation. Water was removed from the reaction mixture by evaporation until the temperature of the resin reached 150° C. The molten material obtained was poured onto an iron plate and cooled to obtain a brittle resin. This resin was soluble in alcohols, and had a flow initiation temperature of 100° C. and a melt viscosity at 130° C. of 210 poises. It had a molecular weight of 770, as measured by the vapor pressure method using acetone as a solvent.

A novolak obtained by the above method and having a flow initiation temperature of 100° C. and a molecular weight of 770 was modified with diphenyl phosphorochloridate

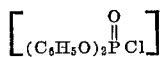

of various phosphorus contents as shown in Table 2 by the procedure to be described below.

The novolak was dissolved in dioxane at room temperature in the presence of pyridine as an acid acceptor. Diphenyl phosphorochloridate was added dropwise to this solution. After the addition, the solution was heated to the refluxing temperature in the course of about 30 minutes. The reaction was performed for an additional one hour under reflux. After the reaction, dioxane was evaporated off at reduced pressure. Ethylene glycol was added to the reaction mixture to dissolve the resinous material obtained. When the solution was gradually poured into water with vigorous stirring, a phosphorus-modified novolak in white powder form was precipitated. After repeated filtration and washing with water, the precipitate was dried at reduced pressure at about 50° C.

In Table 2, the $n$ value represents the degree of modification of the novolak by the monohalogeno phosphorus compound, $n$ being the number of aromatic rings in the novolak with which one monohalogeno phosphorus compound has been reacted.

Each of the phosphorus-modified novolak phenol resin powders was mixed with nylon-6 chips (having an inherent viscosity of 1.10 in meta-cresol at 25° C.), and if desired, with the unmodified novolak powders in various proportions as shown in Table 2, and the mixture was charged into a flask together with phenol in an amount about 3 times the weight of the nylon-6 chips. The mixture was stirred for 30 minutes at 160° C. in an atmosphere of nitrogen to form a uniform solution, and subsequently, phenol was removed by evaporation at reduced pressure to form various molten mixed composition of various phosphorus contents. Each of the mixed compositions obtained was melt-spun from a nozzle with a diameter of 0.25 mm. at a draft of 880 and taken up on bobbins. The uncured fibers obtained were immersed in an aqueous solution containing 17% formaldehyde and 17% hydrogen chloride and cured for 6 hours at room temperature, for 1 hour from room temperature to 100° C., and one hour at 100° C. The cured fibers were thoroughly washed with water, dried at 90° C., and heat-treated for 4 hours at 150° C. in vacuo to form cured fibers. The flame resistances of the resulting cured fibers are shown in Table 2 along with their fiber properties. The results shown in Table 2 demonstrate that the cured fibers of this invention have superior flame resistance.

TABLE 2

| Run No. | Phosphorus-modified novolak | | | Mixing proportion, percent | | | Properties of mixed composition | | | Properties of the uncured fibers | | | Properties of the cured fibers | | | | |
|---|---|---|---|---|---|---|---|---|---|---|---|---|---|---|---|---|---|
| | | | | | | | | | | | | | Fiber properties | | | Flame resistance test | |
| | | | | | | | | | | | | | | | | Bunsen burner test | |
| | Phosphorus content, percent | Flow initiation temperature (°C.) | $n$-Value | Phosphorus modified novolak | Unmodified novolak | Nylon-6 | Phosphorus content, percent | Flow initiation temperature (°C.) | Melt viscosity, poises | Spinning temperature (°C.) | Denier (de.) | Tenacity (g./de.) | Elongation, percent | Denier (de.) | Tenacity (g./de.) | Elongation, percent | Matchstick test | Weight remaining retention (g.) | Flame remaining time (sec.) |
| 2-1 | 4.51 | 69 | 3.0 | 70 | 0 | 30 | 3.12 | 115 | 2,600 | 130 | 2.3 | 0.58 | 14.0 | 2.8 | 0.66 | 17.0 | A | 69 | 0 |
| 2-2 | 4.50 | 73 | 5.0 | 70 | 0 | 30 | 2.50 | 121 | 2,500 | 145 | 2.2 | 0.81 | 11.0 | 3.3 | 1.23 | 7.2 | A | 71 | 0 |
| 2-3 | 4.51 | 69 | 3.0 | 50 | 20 | 30 | 2.25 | 120 | 3,200 | 145 | 1.7 | 0.77 | 20.0 | 3.4 | 1.07 | 9.0 | A | 71 | 0 |
| 2-4 | 2.64 | 82 | 8.0 | 70 | 0 | 30 | 1.90 | 124 | 2,800 | 145 | 2.5 | 0.86 | 6.0 | 3.4 | 1.24 | 12.0 | A | 68 | 0 |
| 2-5 | 2.02 | 84 | 10.0 | 60 | 0 | 30 | 1.33 | 126 | 5,000 | 155 | 3.4 | 0.90 | 8.0 | 3.6 | 1.09 | 20.0 | A | 65 | 0 |
| 2-6 | 1.40 | 86 | 15.0 | 70 | 0 | 30 | 0.95 | 132 | 5,500 | 160 | 4.0 | 0.83 | 9.5 | 3.3 | 0.93 | 19.0 | A | 65 | 0.5 |
| 2-7 | 1.40 | 86 | 15.0 | 30 | 40 | 30 | 0.43 | 132 | 3,300 | 160 | 2.4 | 0.94 | 12.0 | 3.4 | 1.05 | 15.0 | A | 51 | 5.0 |

EXAMPLE 2

70 parts of the phosphorus-containing novolak obtained in Run No. 2–4 of Example 1 was mixed and melted with 30 parts each of nylon-66 and polymetaxylene adipamide (having an inherent viscosity at 35° C. in m-cresol of 1.35 and 1.14, respectively) at 150° C. Each of the molten mixtures was spun by the same procedure as Example 1, treated with formaldehyde and heat-treated to obtain cured fibers.

The results are shown in Table 3. The molten mixtures had superior spinnability, and the fibers obtained exhibited superior fiber properties and a high level of flame resistance.

1.34) and triphenyl phosphate were melted completely at 240° C. Ester-interchange reaction was performed at 210° C. and 20 mm. Hg with stirring. Phenol was evaporated off so that 1.0 equivalent of the ester group of the triphenylphosphate was interchanged. The phosphorus content of the mixed composition obtained, its flow initiation temperature and melt viscosity are shown in Table 5.

The mixed composition was melt-spun under various conditions shown in Table 5 from a nozzle with a diameter of 0.5 mm. The fiber properties of the uncured fibers obtained are shown also in Table 5. The uncured fibers obtained had superior suppleness and flexibility and lent itself to easy handling.

TABLE 3

| Run No. | Polyamide component in the molten mixture | Properties of the molten mixture | | | Spinning conditions | | Properties of the flame-resistant fibers | | | | | | Flame-resistance test | | |
|---|---|---|---|---|---|---|---|---|---|---|---|---|---|---|---|
| | | Phosphorus content, percent | Flow initiation temperature (° C.) | Melt viscosity, poise | Spinning temperature (° C.) | Draft | Properties of the filaments | | | Properties of the fibers | | | Matchstick test | Weight retention, percent | Flame remaining time (sec.) |
| | | | | | | | Denier (de.) | Tenacity (g./de.) | Elongation, percent | Denier (de.) | Tenacity (g./de.) | Elongation, percent | | | |
| 3-1 | Nylon-6,6 | 1.62 | 98 | 4,000 | 135 | 880 | 2.1 | 0.52 | 58 | 4.2 | 1.07 | 7.8 | A | 72 | |
| 3-2 | Polymethaxylylene adipamide. | 1.58 | 98 | 3,800 | 140 | 880 | 2.4 | 0.72 | 15 | 4.1 | 0.97 | 9.6 | A | 68 | |

EXAMPLE 3

305 parts of m-cresol and 72 parts of a 37% aqueous solution of formaldehyde were condensed to form a novolak having a flow initiation temperature of 98° C., a melt viscosity at 130° C. of 105 poises and a molecular weight of 650.

This resin was modified with diphenylphosphorochloridate in the same way as Example 1. Then, a molten mixture consisting of 70 parts of the phosphorus-modified novolak resin and 30 parts of nylon-6 was prepared and melt-spun. The resulting uncured fibers were pre-cured by immersion in an aqueous solution containing 17% formaldehyde and 17% hydrogen chloride while heating the solution from room temperature to 50° C. in the course of 30 minutes, and then post-cured therein for 1.5 hours at 100° C. to form cured fibers.

The above procedure was repeated except that mixed cresol (m-cresol 1 mol/p-cresol 2 mols) was used instead of the m-cresol, and cured fibers were obtained.

The properties of the uncured and cured fibers were determined, and the results are shown in Table 4 below, from which it is seen that superior flame-resistant fibers can be obtained by the method of this invention.

The uncured fibers obtained were immersed in an aqueous solution containing 17% formaldehyde and 17% hydrogen chloride, and cured for 1 hour at 35° C., 1 hour from 40° C. to 100° C., followed by heat-treatment at 150° C. in vacuum for 4 hours to form infusible cured fibers. The flame resistance and fiber properties of these fibers are also shown in Table 5.

During treatment with the formaldehyde, the phosphorus component was not dissolved. It is seen from the results shown in Table 5 that the mixed compositions in Runs Nos. 5–2, 5–3 and 5–6 have superior spinnability to give uncured fibers of good properties, from which cured fibers having superior flame resistance and fiber properties can be obtained. However, the uncured fibers obtained from the composition in Runs Nos. 5–0 and 5–1, which are outside the scope of this invention, have very low elongation and lack flexibility, and the spinnability is not good. In Run No. 5–7, the fibers shrank and adhered to one another during treatment with formaldehyde. When only the novolak as in Run No. 5–0 was spun, filament breakage occurred frequently during spinning, and much unevenness of the fibers obtained was observed. Moreover, unless the spun fibers were carefully handled, they immediately broke or became fine powders.

TABLE 4

| Run No. | Novolak in the mixed composition | Properties of the mixed composition | | | Spinning conditions | | Properties of the uncured fibers | | | Properties of the cured fibers | | | | | |
|---|---|---|---|---|---|---|---|---|---|---|---|---|---|---|---|
| | | | | | | | | | | Fiber properties | | | Flame-resistant test | | |
| | | | | | | | | | | | | | | Bunsen burner test | |
| | | Phosphorus content, percent | Flow initiation temperature (° C.) | Melt viscosity, poises | Temperature (° C.) | Draft | Denier (de.) | Tenacity (g./de.) | Elongation, percent | Denier (de.) | Tenacity (g./de.) | Elongation, percent | Matchstick test | Weight retention, percent | Flame remaining time (sec.) |
| 4-1 | m-Cresol/formaldehyde resin. | 1.50 | 113 | 3,200 | 165 | 880 | 2.1 | 0.94 | 60.0 | 2.4 | 1.50 | 6.0 | A | 53 | 0 |
| 4-2 | Mixed cresol/formaldehyde resin. | 1.48 | 110 | 2,000 | 155 | 650 | 2.5 | 0.60 | 28.0 | 3.0 | 0.98 | 5.0 | A | 57 | 0 |

EXAMPLE 4

A novolak having a flow initiation temperature of 98° C. and a molecular weight of 590 obtained in the same manner as in Example 1, nylon-6 chips (having an inherent viscosity, as measured in m-cresol at 25° C., of

TABLE 5

| Run No. | Mixed composition ||||| Spinning conditions || Properties of the uncured fibers ||| Properties of the cured fibers ||||||
|---|---|---|---|---|---|---|---|---|---|---|---|---|---|---|---|
| | | | | | | | | | | | Fiber properties ||| Flame-resistance test |||
| | | | | | | | | | | | | | | | Bunsen burner test ||
| | Nylon-6 content, percent | Phosphorus content, percent | Flow initiation temperature (° C.) | Melt viscosity, poises | Temperature (° C.) | Draft | Denier (de.) | Tenacity (g./de.) | Elongation, percent | Denier (de.) | Tenacity (g./de.) | Elongation, percent | Matchstick test | Weight retention, percent | Flame remaining time (sec.) |
| 5-0 | 0 | 0 | 98 | 970 | 120 | 350 | 6.5 | 0.5 | 1.2 | 6.8 | 0.28 | 2.0 | A | 45 | 4 |
| 5-1 | 5 | 1.35 | 97 | 1,100 | 120 | 500 | 4.0 | 0.28 | 2.2 | 4.7 | 0.55 | 3.8 | A | 52 | 2 |
| 5-2 | 20 | 1.33 | 108 | 2,300 | 140 | 880 | 2.3 | 0.91 | 5.3 | 3.5 | 1.20 | 9.7 | A | 72 | 0 |
| 5-3 | 25 | 1.82 | 117 | 2,900 | 150 | 880 | 2.2 | 1.05 | 6.0 | 3.1 | 1.34 | 24.0 | A | 70 | 0 |
| 5-4 | 25 | 0 | 116 | 2,800 | 150 | 880 | 2.3 | 1.02 | 6.5 | 3.2 | 1.30 | 22.5 | A | 42 | 6 |
| 5-5 | 25 | 0.35 | 119 | 3,000 | 150 | 880 | 2.4 | 1.02 | 7.5 | 3.5 | 1.15 | 22.0 | A | 52 | 5 |
| 5-6 | 30 | 1.32 | 122 | 3,500 | 155 | 880 | 2.5 | 0.90 | 10.0 | 3.5 | 1.20 | 23.0 | A | 65 | 0 |
| -7 | 50 | 0.99 | 148 | 2,700 | 180 | 880 | 2.5 | 1.04 | 26.0 | Not measurable because of the adhesion of the fibers during treatment with formaldehyde |||||||

The resulting fibers of Run No. 5–3 were tested as to flame resistance by the matchstick test and the Bunsen burner test in comparison with commercially available cured novolak fibers, polyvinyl chloride fibers, acrylic fibers, rayon fibers and acetate fibers. The results are shown in Table 6.

TABLE 6

| Fibers | Matchstick test | Bunsen burner test || Remarks |
|---|---|---|---|---|
| | | Weight retention, percent | Flame remaining time (sec.) | |
| Fibers of Run No. 5-3 | A | 70 | 0 | No glow. |
| Cured novolak fibers | A | 44 | 0 | Glow. |
| Polyvinyl chloride fibers | A | 20 | 3 | Much occurrence of soot. |
| Acrylic fibers | C | 13 | 12 | |
| Rayon fibers | C | 18 | 15 | |
| Acetate fibers | B | 0.4 | 7 | Burnt up. |

EXAMPLE 5

23 parts of each of various phosphoric acid triesters shown in Table 7 were added to 77 parts of a mixture of 70% of the same novolak as used in Example 4 and 30% of nylon-6, and ester-interchange reaction was performed for 50 minutes at 240° C. by the same procedure as in Example 4. Phenol corresponding to 1.10–1.15 equivalents of the ester group of the phosphoric acid triester was evaporated. The properties of the resultant phosphorous-modified mixed compositions are shown in Table 7. These compositions did not become infusible or gelled even when maintained in the molten state for prolonged periods of time.

Each of the mixed compositions was melt-spun at 150° C. at a draft of 880, and then treated with formaldehyde under the same conditions as in Example 4. The resultant cured fibers had superior flame resistance, as shown in Table 7.

EXAMPLE 6

(A) 76.5 parts of the same novolak as used in Example 4, 23.5 parts of triphenyl phosphate and 1.1 parts of nylon 6 were added, and ester-interchange reaction was performed at 240° C. for 100 minutes at 25 mm. Hg. The amount of phenol which evaporated off during the heating period was 6.8 parts. The amount of the reacted ester group of the tri-phenyl phosphate which was determined on the basis of the amount of phenol that evaporated off was 1.0 equivalent.

(B) Ester-interchange reaction was performed in the same way as in (A) above except that 0.5 part of zinc acetate was used as ester-interchange catalyst instead of 1.1 parts of nylon 6. The amount of phenol that evaporated off during the heating period was 1.7 parts. It was found that 0.25 equivalent of the ester group of the triphenyl phosphate was reacted.

(C) Ester-interchange reaction was performed in the same way as in (A) above except that nylon 6 was not used. The amount of phenol that evaporated off during the heating period was less than 0.1 part. The amount of the ester group of the triphenyl phosphate which was reacted was only less than 0.015 equivalent, which means that it was hardly reacted.

An additional amount of nylon 6 was added to the product obtained in (A) above to form a mixed composition in which the total amount of the nylon was 25% based on the total weight of the composition. The mixed composition was melt-spun, and then treated with formaldehyde in the same way as set forth in Example 5 to form cured infusible fibers having superior flame resistance and fire retardancy.

EXAMPLE 7

The melt viscosities of the mixed composition in Run No. 5–3 in Example 4 and the novolak resin alone were

TABLE 7

| Run number | Phosphoric acid triester | Mixed composition |||| Flame resistance test |||
|---|---|---|---|---|---|---|---|---|
| | | | | | | | Bunsen burner test ||
| | | Phosphorus content, percent | Flow initiation temp. (° C.) | Melt viscosity (poises) at— ||| Matchstick test | Weight retention, percent | Flame remaining time (sec.) |
| | | | | 130° C. | 140° C. | 150° C. | | | |
| 7-1 | Triphenylphosphate | 2.30 | 121 | 53,000 | 11,300 | 3,870 | A | 68.0 | 0 |
| 7-2 | Tricresylphosphate | 2.01 | 110 | 12,300 | 4,040 | 1,870 | A | 65.4 | 0 |
| 7-3 | Tri-p-chlorophenyl phosphate | 1.75 | 116 | 12,900 | 4,150 | 1,620 | A | 69.1 | 0 |
| 7-4 | Tri-o-chlorophenyl phosphate | 1.80 | 106 | 2,730 | 820 | | A | 68.9 | 0 | measured at various temperatures. The results are given in Table 8 below.

TABLE 8

| Temperature (° C.) | Melt-viscosity of the novolak/nylon-6 mixture (poises) | Melt-viscosity of novolak (poises) |
| --- | --- | --- |
| 105 | | 17,000 |
| 110 | | 7,100 |
| 120 | | 970 |
| 130 | | 190 |
| 140 | 7,300 | 75 |
| 150 | 2,900 | |
| 160 | 1,300 | |
| 170 | 600 | |

The viscosity which is stable to spinning is 1000 to 5000 poises. The novolak/nylon-6 mixture has a spinnable temperature width of about 20° C., but the molten novolak alone has a spinnable temperature width of only about 8° C. Therefore it is seen that the former is stable to spinning even when the spinning temperature varies over some range, but the latter is unstable to spinning even when the spinning temperature fluctuates a little, giving rise to filament breakage or non-uniformity.

The uncured fibers of Run No. 5–3 in Example 4 and the uncured fibers of the novolak alone were treated with formaldehyde, and the properties of the cured fibers were measured. The results are shown in Table 9.

TABLE 9

| Run No. | Uncured fibers | Heating schedule in formaldehyde treatment (hours) | | | Fiber properties of cured fibers | |
| --- | --- | --- | --- | --- | --- | --- |
| | | Room temp. | Room temp. 60° C. | 60° C.– 100° C. | Tenacity (g./de.) | Elongation, percent |
| 9–1 | Uncured fibers of Example 4, Run No. 5–3. | 15 | 1.0 | 1.0 | 1.25 | 12.6 |
| | | 0 | 4.5 | 1.0 | 1.29 | 23.7 |
| 9–2 | Uncured novolak fibers. | 15 | 1.0 | 1.0 | 0.62 | 4.7 |
| | | 0 | 4.5 | 1.0 | 1.08 | 7.3 |

The results given in Table 9 show that the uncured fibers spun from the novolak/nylon 6 molten mixture (Run No. 9–1) can be converted to cured fibers of satisfactory properties even when treated with formaldehyde at a larger rate of temperature rise within shorter periods of time. When the uncured novolak fibers (Run No. 9–2) are treated with formaldehyde at a larger rate of temperature rise, the properties of the cured fibers become poor, which means that such fibers must be treated for longer periods of time at a smaller rate of temperature rise.

EXAMPLE 8

The cured fibers in Run No. 5–3 of Example 4 and commercially available cured novolak fibers were made into staple form, and their whiteness was measured.

The measurement of whiteness was conducted as follows: Using a spectrophotometer (Hitachi, EPU–2A), the refractive index (R percent) of the sample at a wavelength of 450 mµ was measured, and the Hunter whiteness (W value) was measured by means of a color machine (Hitachi Limited).

The staple fibers were dyed with a disperse dye under the following conditions.

Dye:
Resoline Blue FBL (Bayer CI No. Disperse Blue 56, or
Dianix Red R–E (Mitsubishi Chemical) CI No. Disperse Red 101
Composition of bath:
Dye 5% O.W.F.
Dispersing agent (Disper TL, Meisei Chemical), 1 g./liter
Acetic acid 1% O.W.F.
Goods-to-liquor ratio: 1:50
Temperature: 130° C.
Time: 60 minutes The degree of dyeing of the fibers was examined by determining K/S value (K=coefficient of absorption of the sample, S=coefficient of scattering) which was proportional to the dyeing density. The K/S value was calculated in accordance with the Kubelka-Munk equation:

$$K/S = (1-R)^2/2R$$

wherein R is the refractive index of the sample at a wavelength of 500 mµ measured by a spectrophotometer (EPU–2A, Hitachi Limited)

(K/S values were corrected in consideration of the color of the fibers before dyeing.)

A 100 mm. long fiber sample was prepared from each of the fibers, and the elastic recovery of the sample at the time of relaxing after stretching at 10%/min. by 1%, 3%, 5%, 7% and 10%. The results are shown in Table 10.

TABLE 10

| | Cured fibers of Run No. 5–3 | Commercially available novolak fibers |
| --- | --- | --- |
| Whiteness: | | |
| R, percent | 7.0 | 3.5 |
| W value | 48.8 | 38.2 |
| Dyeability (K/S value): | | |
| Blue | 9.6 | 0.9 |
| Red | 16.8 | 2.3 |
| Elastic recovery at— | | |
| 1% stretch | 100 | 98 |
| 3% stretch | 100 | 93 |
| 5% stretch | 91 | 85 |
| 7% stretch | 80 | 69 |
| 10% stretch | 60 | 51 |

The fibers obtained in Run No. 5–3 had a phosphorus content of 1.60% and 1.53% before and after dyeing respectively, and even after dyed at 130° C., the fibers retained phosphorus in an amount of 96% of the amount before the dyeing operation and exhibited durable flame resistance.

For comparison, the fibers of Run No. 5–4 before heat-treatment were further treated with dioxane containing 16% phosphorus oxychloride at 80° C. for 60 minutes. Excesses of the phosphorus oxychloride and dioxane were removed by washing with water, and heat-treated at 150° C. for 4 hours in vacuo. This post-treatment made it possible to incorporate 1.06% phosphorus in the fibers. But by the above dyeing operation, the phosphorus content of the fibers was reduced to 0.44%, and the rate of phosphorus retention during the dyeing operation was only 42%. The dyed fibers burned.

The cured fibers of Run No. 5–3 were drawn to 1.4 times the original length on a hot plate at 180° C. before heat-treatment and heat treated at 150° C. for 4 hours in vacuum. The drawn fibers obtained had a tenacity of 2.1 g./d. and an elongation of 9%, showing a great improvement in tenacity.

EXAMPLE 9

The cured fibers obtained in Run No. 5–3 of Example 4 were made into a 45,000 denier tow, preheated in hot water at 97° C., and fed into a stuffer box crimper. At this time, steam at 140° C. was blown into the stuffer box. The crimped tow obtained was cut to a length of 52 mm. and heat-treated in vacuo at 150° C. for 4 hours.

The stable fibers obtained had a number of crimps of 88 turns per inch, a degree of crimp of 11.9%, a degree of crimp elasticity of 85.8% and a degree of residual crimp of 10.3%.

Flame resistance tests were conducted on these staple fibers (to be designated "Fiber A") alone or a uniform blend of them with rayon Modacrylic or "Nomex" staples. The results are shown in Table 11.

TABLE 11

| Run No. | Samples | Blending proportion (w./w. percent) | Flame resistance test Matchstick test | LOI, percent |
|---|---|---|---|---|
| 11-1 | Fiber A | | A | 36 |
| 11-2 | Rayon/Fiber A | 30/70 | A | 30 |
| 11-3 | do | 50/50 | A | 29 |
| 11-4 | do | 65/35 | B | 26 |
| 11-5 | Rayon | | C | 22 |
| 11-6 | Modacrylic/Fiber A | 50/50 | A | 31 |
| 11-7 | Modacrylic | | A | 28 |
| 11-8 | "Nomex"/Fiber A | 50/50 | A | 32 |
| 11-9 | "Nomex" | | A | 28 |
| 11-10 | Cured novolak fiber | | A | 34 |

The fibers in Runs Nos. 11-1, 11-2, 11-3, 11-4, 11-6 and 11-8 were each spun by the customary method to form spun yarns of excellent flame resistance.

The fibers of Run No. 11-1 were made into webs, which were bonded with a phenolic adhesive to form a nonwoven fabric of excellent flame resistance.

What is claimed is:

1. A method of producing flame-resistant fibers, which comprises melt-spinning a mixed composition consisting of 60-90% by weight of a fusible, curable phosphorus-modified novolak and 10-40% by weight of a nylon and having a phosphorus content of at least 0.5% by weight, and treating the uncured fibers obtained with formaldehyde in the presence of an acid catalyst to give cured infusible fibers.

2. The method of claim 1, wherein said mixed composition is prepared by reacting a fusible, curable novolak, a nylon and a phosphoric acid triester of the general formula

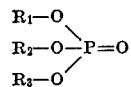

wherein $R_1$, $R_2$, and $R_3$ may be the same or different, and each represent a phenyl group, an alkyl-substituted phenyl group or a halogen-substituted phenyl group, so that 0.8 to 1.5 equivalents of the ester group of the phosphoric acid triester are ester-interchanged.

3. The method of claim 2, wherein the mixed composition is prepared by heating a required amount of said phosphoric triester, a fusible, curable novolak resin and a nylon resin either of which resins is in an amount less than the finally required amount, or by heating a required amount of said phosphoric triester, and both of said resins in amounts less than the finally required amounts to complete the ester-interchange reaction, and thereafter adding the remainder of either or both of these resin components.

4. The method of claim 1, wherein the fibers are drawn at least 1.1 times the original length at 100° C. to 300° C. after partial or whole cure-treatment with formaldehyde.

5. The method of claim 1, wherein the cured infusible fibers are heat-treated at 120° C. to 250° C. in the absence of oxygen.

6. Insoluble and infusible cured fibers having flame resistance comprising from 60 to 90% by weight of a phosphorus modified novolak and from 10 to 40% by weight of a nylon, and having a phosphorus content of at least 0.5% by weight, said cured fibers having a flame remaining time, measured by the Bunsen burner test, of substantially zero and being dyeable with disperse dyes.

7. Flame-resistant fibrous articles comprising 30 to 80% by weight of the cured fibers of claim 6 and 70 to 20% by weight of other fibers.

References Cited

UNITED STATES PATENTS

| | | | |
|---|---|---|---|
| 3,650,102 | 3/1972 | Economy et al. | 260—838 |
| 3,651,199 | 3/1972 | Blume et al. | 260—59 |
| 2,660,546 | 11/1953 | McCarthy | 260—841 |
| 3,259,670 | 7/1966 | Weltman et al. | 260—841 |
| 3,634,307 | 1/1972 | Morton | 260—841 |
| 3,692,867 | 9/1972 | Mayer et al. | 161—169 |
| 3,639,953 | 2/1972 | Kimura et al. | 161—172 |
| 2,484,523 | 10/1949 | McClellan | 260—841 |
| 2,412,054 | 12/1946 | McClellan | 260—841 |
| 2,378,667 | 6/1945 | Uaala | 260—841 |
| 3,363,025 | 1/1968 | Fitko et al. | 260—841 |

JOHN C. BLEUTGE, Primary Examiner

U.S. Cl. X.R.

57—140 R; 161—169, 172; 260—45.7 P, 45.95, 53 R, 54, 59; 264—176 F, 210 F

UNITED STATES PATENT OFFICE
CERTIFICATE OF CORRECTION

Patent No. 3,808,289      Dated April 30, 1974

Inventor(s) TOMOMI OKUHASHI ET AL

It is certified that error appears in the above-identified patent and that said Letters Patent are hereby corrected as shown below:

Insert patentees' Foreign Application Priority Data as follows:

-- Claims priority, application Japan, November 9, 1971, No. 46-89317. --

Signed and sealed this 18th day of February 1975.

(SEAL)
Attest:

RUTH C. MASON
Attesting Officer

C. MARSHALL DANN
Commissioner of Patents
and Trademarks